United States Patent Office 3,149,116
Patented Sept. 15, 1964

3,149,116
PROCESS FOR THE DEHYDRATION OF HY-
DROXYETHYL - SUBSTITUTED PYRIDINES,
QUINOLINES, AND ISOQUINOLINES
Hans Binder, Frankfurt am Main Sud, Otto Koch, Bo-
chum, and Julius Altpeter, Bad Homburg vor der Höhe,
Germany, assignors to Rutgerswerke-Aktiengesellschaft,
Frankfurt am Main, Germany
No Drawing. Filed June 21, 1961, Ser. No. 118,504
Claims priority, application Germany June 24, 1960
5 Claims. (Cl. 260—283)

This invention relates to the dehydration of heterocyclic compounds and it has particular relation to a process in which heterocyclic compounds are dehydrated in the presence of catalytic amounts of strong alkalis or of an acid reacting substance, in the liquid phase.

It has been known to dehydrate heterocyclic compounds by treating the compound, e.g. 2-pyridine-ethanol with pulverized caustic alkali and distilling off under vacuum the 2-vinylpyridine formed after allowing the reaction mixture to stand for 24 hours. (See E. Proff, Chemische Technik, 7 (1955), page 514.) It has also been known to convert 2-pyridine-ethanol by dehydration into 2-vinylpyridine, by adding drop by drop a 50% aqueous solution of 2-pyridine-ethanol to a 50% aqueous solution of NaOH, which is heated to 150–160° C. and separating the 2-vinylpyridine by steam distillation simultaneously (see U.S. Patent No. 2,848,456). Both of these processes have the disadvantage that in carrying them out on a semi-commercial or commercial scale the 2-vinylpyridine is resinified to a considerable extent by the solution of caustic soda and due to this, the yield is reduced to 50–75%.

Furthermore, it has been known to dehydrate heterocyclic ethanols, e.g. 2-pyridine-ethanol by causing this alcohol to pass over contacts at 250–400° C. (see DDR Patent No. 13,286). Thereby, in addition to unreacted 2-pyridine-ethanol, due to splitting off of formaldehyde, α-picoline is obtained, the separation of which from 2-vinyl-pyridine is troublesome due to the small difference in boiling point. Moreover, the contact must be frequently regenerated and this causes considerable loss of time and consumption of material. The yields in the dehydration over contacts amount to 50–70%.

It has now been found that dehydration of heterocyclic alcohols to the corresponding vinyl compounds can be brought about with almost quantitative yields and without side reactions by proceeding as follows.

An aqueous solution of, for example, 2-pyridine-ethanol, which preferably contains 50 parts by volume of water and 50 parts by volume of 2-pyridine-ethanol, is slowly introduced into a reagent which is inert to the alcohol to be dehydrated and the product to be formed and consists of glycerol, or triethanolamine, or high-boiling glycols, is heated to about 180° C. and in which a catalytic amount of solid caustic alkali or of an acid reacting substance is dissolved or distributed. Dehydration to 2-vinylpyridine takes place at once and 2-vinylpyridine distills off in an amount corresponding to the amount of 2-pyridine-ethanol solution added to the reaction solution. The heterocyclic alcohol solution to be dehydrated can be injected by means of a nozzle, for example from below, into the dehydrating medium. It is of particular advantage to spray the solution to be dehydrated into the dehydrating medium in such manner that the solution is uniformly distributed on the surface of the reaction medium. In carrying out this invention for one part of the heterocyclic alcohol 1 to 5 parts of $H_2O$ can be used.

According to this process of the invention, 4-pyridine-ethanol can likewise be converted with almost quantitative yield into 4-vinyl-pyridine, while according to the prior processes the yields amounted to about 50% only, due to the high tendency of polymerization of this compound. 2-methyl-6-pyridine-ethanol can be converted into 2-methyl-6-vinylpyridine likewise with quantitative yields by the process of the present invention. In carrying out the present process, the alkali is present in the reaction medium in the form of a very dilute solution in catalytic amounts, whereby polymerization of the vinyl pyridine at increased temperature is prevented.

If in the process of the present invention the alkaline or acid catalyst is omitted, then a partial decomposition of the dehydrated compound and a re-formation of the heterocyclic alkyl compound takes place and the yields of the vinyl compounds are then far below the yields of vinyl compounds obtained in the process of the invention.

Example 1

5 liters of a mixture consisting of 2-pyridine-ethanol and water in the proportion of 1:1 by volume, are caused to flow per hour into a solution of 100 grams of solid NaOH in 10 kilograms of triethanolamine heated to 100°–200° C., under vigorous stirring. The 2-vinylpyridine formed is distilled off by the water vapor formed. The temperature in the sump of the triethanolamine solution is 200–220° C. and at the head 110–125° C. Residual portions of 2-vinylpyridine which may remain in the triethanolamine solution, can be driven out without the formation of resinous products by adding drop by drop 100–200 ccm. water to the hot triethanolamine solution. The yield of 2-vinylpyridine, based on 2-pyridine-ethanol, amounts to 98–99%. Triethanolamine can be used several times for new reactions with 2-pyridine-ethanol.

Example 2

5 liters of a mixture consisting of 4-pyridine-ethanol and water in the proportion of 1:1 by volume, are caused to flow per hour drop by drop into a solution of 100 grams of solid NaOH in 10 kilograms of triethanolamine heated to 100°–200° C. under vigorous stirring. The further procedure is the same as in the above Example 1 and the 4-vinylpyridine formed is continuously distilled off with water vapor. The yield amounts to 98%.

Example 3

5 liters of a mixture consisting of 2-methyl-6-pyridine-ethanol and water in the proportion of 1:1 by volume, are caused to flow drop by drop per hour into a solution of 100 grams of solid NaOH in 10 kilograms of triethanolamine heated to 100°–200° C. under vigorous stirring. The details of the further procedure are the same as in the above Example 1 and the 2-methyl-6-vinylpyridine is continuously distilled off with water vapor. The yield amounts to 98–99%.

Instead of the 2-methyl-6-pyridine-ethanol, in the same manner 2-β-hydroxyethyl-quinoline can be dehydrated.

In all of the above examples the triethanolamine can be substituted by glycerol, or a glycol or glycol ether, having a boiling point higher than that of the vinyl compound to be formed.

Example 4

129 liters of an aqueous solution consisting of water and about 50% by volume of 2-pyridine-ethanol is caused to flow drop by drop into 10 kilograms of a solution of 1% by weight of potassium bisulfate in glycerol, heated to 180–200° C. From the vapors distilling off from the glycerol, 2-vinylpyridine is obtained with practically quantitative yield. The glycerol can be removed after the reaction and reused again several times for new reactions with 2-pyridine-ethanol before it has to be purified by distillation.

Example 5

5 liters of an aqueous solution consisting of water and about 50% by volume of 2-pyridine-ethanol is caused to flow drop by drop into 0.5 kilogram of a solution of 1% $NH_4H_2PO_4$ and 1% $H_3PO_4$ in glycerol heated to 180–200° C. 2-vinylpyridine is obtained from the vapors distilling off from the glycerol with practically, quantitative yield. The dehydrating solution can be re-used as described in Example 4.

Example 6

0.5 kilogram of polyglycol having a molecular weight of about 4000 and containing 1% by weight of $H_2SO_4$, are heated to 100°–200° C. Into this polyglycol 5 liters of a mixture consisting of 50% of water and 50% by volume of 2-pyridine-ethanol are caused to flow and distilled off with the evolving water vapors. 2-vinylpyridine is thus obtained with quantitative yield.

By substituting for the $H_2SO_4$ an equivalent amount of citric acid, 2-vinylpyridine is obtained with a likewise satisfactory yield.

Example 7

2-quinoline-ethanol is converted into 2-vinyl-quinoline by the procedure and with the yield described in the above Example 6.

Example 8

In any of the above Examples 1–7, the heterocyclic alcohol-water mixture is introduced into the inert, heated solvent by injection from below.

Example 9

In any of the above Examples 1–7, the heterocyclic alcohol-water mixture is introduced into the inert, heated solvent by spraying it in uniform distribution into the solvent so that it is uniformly distributed on the surface of the solvent.

Example 10

65 liters of 2-pyridine-ethanol is caused to flow drop by drop into 10 kilograms of a solution of 1% by weight of potassium bisulfate in glycerol when simultaneously vapor of water is introduced into the reaction vessel in keeping the proportion of vapor and heterocyclic alcohol as 1:1 by weight.

It will be understood that this invention is not limited to the steps, proportions, and other details specifically described above and can be carried out with various modifications. For example, the alkaline or acid reacting catalyst can be used in the range of 0.1 to 5% based on the weight of the liquid reaction medium, and the temperature of the latter during reaction should be in the range of 150 to 250° C. As catalyst KOH can also be used, and a further acid-reacting catalyst is e.g. citric acid. The term "polyglycols" is used to denote glycols with more than 3 C-atoms having boiling points above 250° C. These and other modifications may be made without departing from the scope of the invention, as defined in the appended claims.

What is claimed is:

1. A process for the dehydration of a heterocyclic alcohol selected from the group consisting of hydroxyethyl compounds of pyridine, quinoline, isoquinoline and their homologues comprising introducing such heterocyclic alcohol and water into an organic solvent which is inert to the heterocyclic alcohol and the dehydration product to be formed, has a higher boiling point than the dehydration product to be formed, contains in uniform distribution a catalytic amount of 0.1 to 5% by weight based on the weight of the liquid reaction medium of a substance selected from the group consisting of caustic alkali and acid reacting compounds, under heating to 180°–220° C. and vigorous stirring, whereby the dehydration product continuously distills off together with water vapor, said organic solvent being selected from the group consisting of triethanolamine, glycerol, glycol, glycolethers and polyglycols.

2. A process as claimed in claim 1, in which the heterocyclic alcohol is introduced in the form of an aqueous solution into the organic solvent.

3. A process as claimed in claim 1, in which the heterocyclic alcohol is introduced simultaneously with the introduction of water vapor into the organic solvent.

4. A process as claimed in claim 1, in which the organic solvent is triethanolamine.

5. A process as claimed in claim 1, in which for one part of the heterocyclic alcohol to be dehydrated 1 to 5 parts of $H_2O$ are used.

References Cited in the file of this patent

UNITED STATES PATENTS

| 2,698,848 | Mahan | Jan. 4, 1955 |
| 2,848,456 | Dimond et al. | Aug. 19, 1958 |
| 2,868,796 | Cislak | Jan. 13, 1959 |

FOREIGN PATENTS

| 632,661 | Great Britain | Nov. 28, 1949 |

OTHER REFERENCES

MacArdle: Use of Solvents, 1925, p. 3.